Feb. 14, 1956    W. SCHAELCHLIN ET AL    2,734,391
VARIABLE SPEED DRIVE BELT SHIFTER
Filed June 18, 1952    2 Sheets-Sheet 1

United States Patent Office 2,734,391
Patented Feb. 14, 1956

2,734,391

VARIABLE SPEED DRIVE BELT SHIFTER

Walter Schaelchlin and Clarence E. Gary, Buffalo, N. Y., assignors to Westinghouse Electric Corporation, East Pittsburgh, Pa., a corporation of Pennsylvania Application June 18, 1952, Serial No. 294,149

16 Claims. (Cl. 74—242.3)

This invention relates generally to mechanical drives and more in particular, to such drives which are adaptable for controlling the relative positions or the relative speeds of a pair of movable members.

Applications of the type generally referred to hereinabove are found, for example, in the control of the separate sections of a paper mill. In such an application it is necessary in some instances to control the relative speeds of the stands to maintain the proper relationship between the peripheral speeds of the rolls and in other instances it is necessary to maintain a fixed angular position relationship between the rolls of the respective stands. In such a drive a reference control quantity is utilized as a basis for speed or position regulation. This quantity is usually differentially compared with a quantity corresponding to the speed or position of a machine driving a given stand in order to obtain an error quantity indicative of the control which is required to bring the given machine into position or speed correspondence with the reference quantity.

In many such applications mechanical types of differentials may be utilized to obtain the error quantity and in order to achieve a degree of drive flexibility in situations, for example, where the speeds of the successive stands may not be identical, it is desirable to provide a form of variable speed device between the machine driving a given stand and one input to the differential associated with and driven by that particular machine. Arrangements of this type are frequently cumbersome and expensive to build and if not properly designed, may require too much maintenance service.

Accordingly, it is one object of this invention to provide a unitary mechanical drive involving a variable speed input.

Another object of this invention is to provide a drive of the character referred to which is simple with respect to operational requirements and positive in operation.

A further object of this invention is to provide a variable speed differential drive of a compact nature.

In sectionalized mill drives provision must be made for obtaining an adjustable amount of draw between the respective mill stands. The apparatus herein generally described embodying the variable speed cone pulley drive affords adjustment of the amount of draw between the mill sections by means of adjustment of the belt of the cone pulley drive along the cone pulleys to vary the drive ratio from the driving to the driven pulley. The setting of the draw adjustment for normal operation, during which the web is being fed through the respective sections of the mill, is frequently not satisfactory for a threading operation when a new web is being threaded through the mill. The draw may be varied by manipulating the mechanism which drives the belt shifter carriage to vary the draw as required during the threading operation, whereafter during continued operation this same mechanism may be further adjusted to move the belt shifter carriage to obtain the required draw for continued mill operation. In many respects this adjustment is unwieldy.

Accordingly, it is a further object of this invention to provide a variable speed drive of the character referred to wherein provision is made for incremental adjustment of the belt shifter with respect to the belt shifter carriage to obtain small adjustments of the relative speeds of the cone pulleys without moving the belt carriage.

The foregoing statements are merely illustrative of the various aims and objects of this invention. Other objects and advantages will become apparent upon a study of the following disclosure when considered in conjunction with the accompanying drawings, in which.

Figure 1:
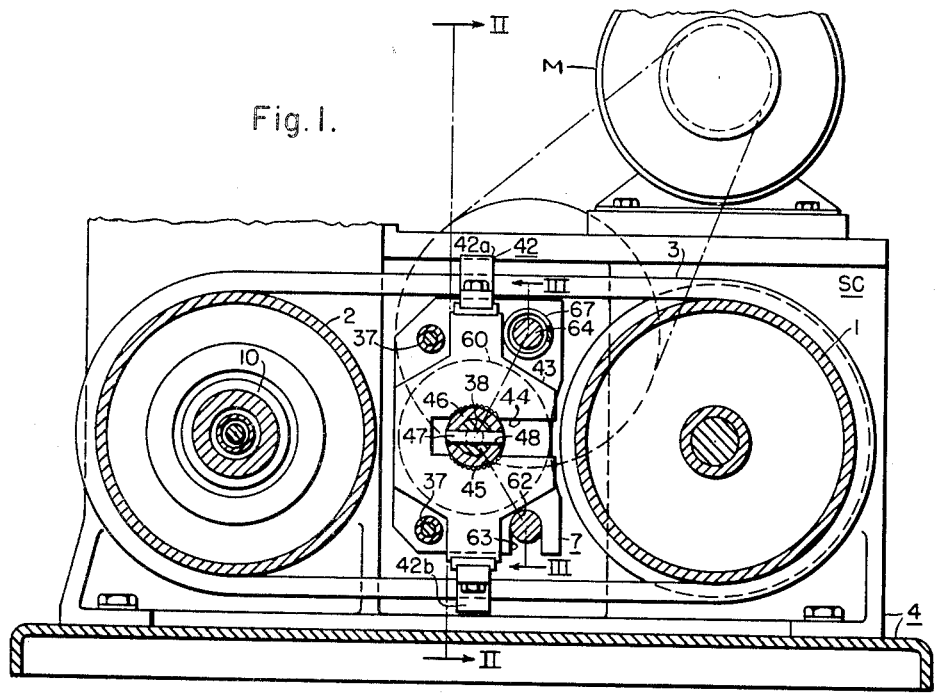
Fig. 1 is an end view fragmentarily in section of a mechanical drive embodying the principles of this invention.
Figure 2:
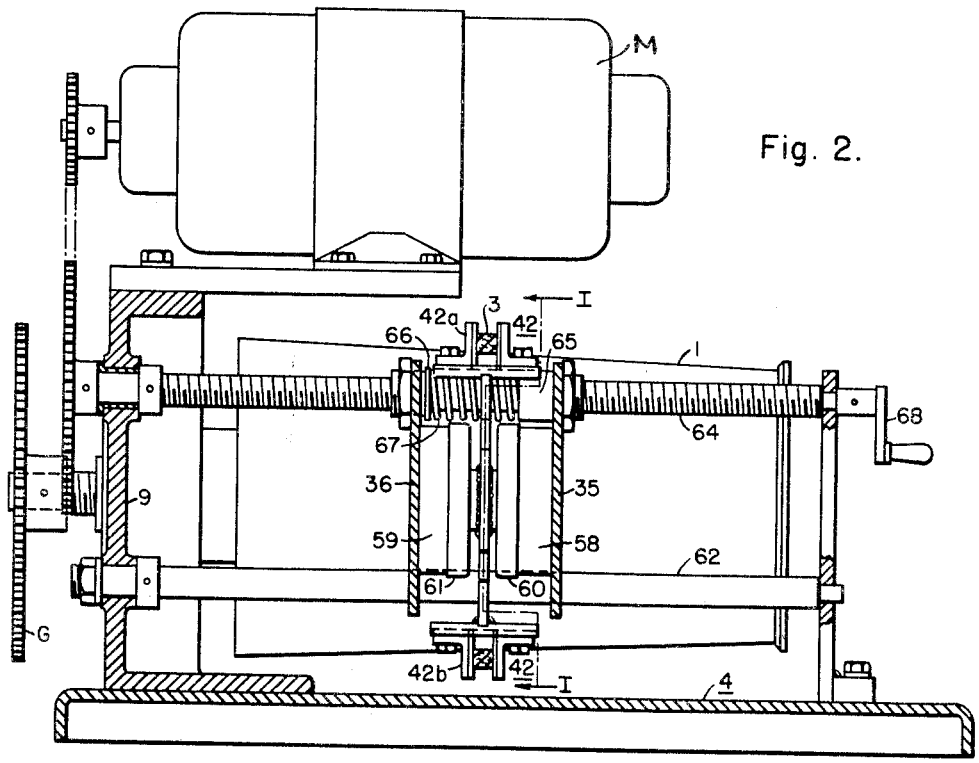
Fig. 2 is a longitudinal sectional view taken approximately on the line II—II of Fig. 1.
Figure 3:
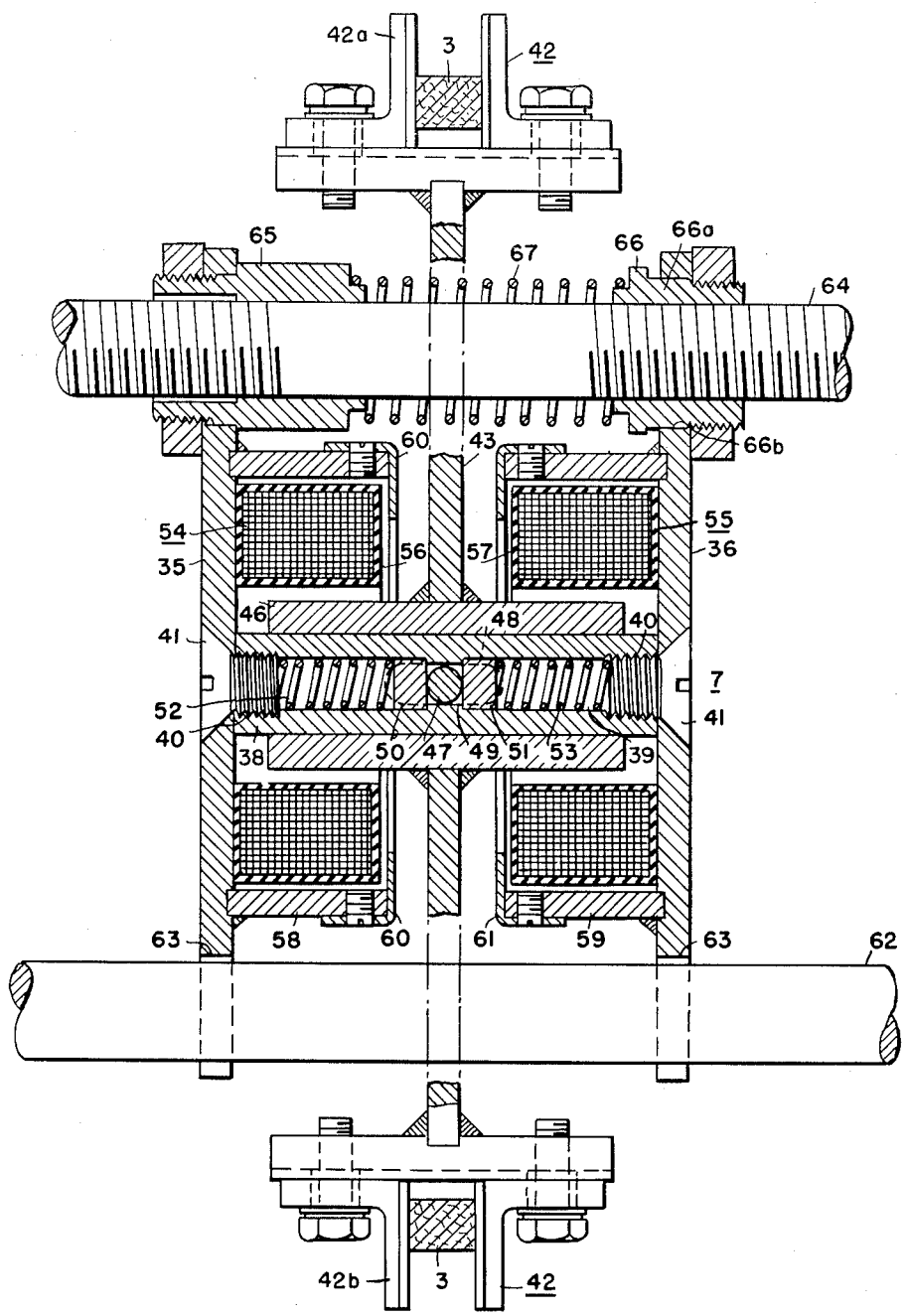
Fig. 3 is a sectional view taken approximately on line III—III of Fig. 1.

The details of the mechanical drive appear in Figs. 1, 2 and 3 wherein the speed changer SC, involving a pair of cone pulleys 1 and 2 connected by a belt 3 is mounted upon a support generally designated 4.

The belt 3 is engaged by a belt shifter assembly generally designated 7, disposed between the cone pulleys, which is provided for the purpose of adjusting the belt 3 axially of the cone pulleys to provide a variation in the drive ratio therebetween. Thus depending upon the position of the belt 3 along the respective cone pulleys 1 and 2, the cone pulley 2, which is the driven pulley, will be operating at some speed either equal to, greater than or less than the speed of the cone pulley 1. Cone pulley 1 may be directly connected to a motor which is to be regulated. Gear G may be used for this purpose.

By movement of the belt shifter assembly or carriage axially of the cone pulleys the drive ratio between the cone pulleys is varied. To this end the belt shifter carriage is mounted for axial movement along the length of the cone pulleys. A sectional view of the belt shifter carriage 7 is illustrated in Fig. 3. This section is taken through the carriage along an axis parallel to the axes of the cone pulleys as illustrated by section lines III—III of Fig. 1. This belt shifter carriage comprises a body portion having end plates 35 and 36. These end plates are secured in spaced relation as indicated by a pair of spacers 37 appearing only in Fig. 1 and a spacer 38 which appears in both Fig. 1 and Fig. 3. Spacer 38 is of tubular configuration having a hole 39 extending therethrough. The end portions of this tubular spacer are tapped at 40 to receive screws 41 which extend through respective end plates 35 and 36 and thread into the tapped end sections to secure the assembly.

The belt shifter 42 comprises a magnetizable plate 43, the configuration of which is best seen in Fig. 1. The ends of this plate project above and below the carriage respectively and have mounted thereon respective yokes 42a and 42b which engage the opposite sides of belt 3. Plate 43 is provided with a slot 44 extending through one side thereof having arcuate side portions 45 about the geometric center of the plate. A sleeve bearing 46 is fitted through the arcuate side portions of this slot and secured to the magnetizable plate 43 by any suitable means such as welding or brazing.

Sleeve 46 is slidably mounted about the tubular spacer and is secured against rotation about the spacer by means of a pin 47 which moves through slotted openings 48 at diametrically opposite points in the walls of the tubular spacer and is secured in sleeve 46. Provision is made for centrally positioning the belt shifter 42 substantially centrally of the carriage along the tubular spacer. Specifically this provision includes a shoulder 49 which is formed centrally within the tubular spacer. Plungers 50 and 51 are slidably fitted into the tubular spacer on opposite sides of shoulder 49 and abut the shoulder. These plungers are maintained in the position indicated by respective compression springs 52 and 53 which are compressed between the respective plungers 50 and 51 and the screws 41 which are threaded into the ends of the tubular spacer. In the position illustrated the pin 47 is biased to a central position along the tubular spacer and when displaced to one side or the other, it must move against the force of the respective springs which tend also to move the pin and hence, the belt shifter to its central position. Consequently, this belt shifter is resiliently secured in a central position on the belt shifter carriage. The pin 47 is sufficiently small in dimension between the confronting faces of plungers 50 and 51 to slightly clear the plunger faces when the plungers abut the shoulder 49. Thus, a strong centering bias is applied to the pin 47 and the spring load of the inactive spring, when the pin 47 is displaced from central position, is carried by the shoulder 49.

The plate 43 is formed of magnetic material and constitutes the armature for a pair of oppositely disposed electromagnets 54 and 55. The respective electromagnets comprise magnetizing coils 56 and 57 which are of substantially annular configuration and are disposed about the sleeve 46 against the respective inner faces of end plates 35 and 36. The magnetic circuit of the respective magnets include respective annular members 58 and 59 which are disposed about the respective coils 56 and 57. The ends of these annular members adjacent the respective end plates are fitted respectively into a suitable groove which is milled in the inner face of each plate and secured in this position by means of welding or brazing. The remaining ends of these annular members confront opposite sides of the armature plate 43 and are spaced therefrom in an amount to provide limited movement of the belt shifter with respect to the carriage by magnetic attraction in either direction from the centrally illustrated position. Small angle sections or rings of angular cross-section designated 60 and 61 are respectively fitted over the ends of respective members 58 and 59 which confront the opposite sides of the armature plate to prevent sticking of the armature plate to the pole faces constituted by the ends of the respective annular members.

The belt shifter carriage is mounted upon a pair of bars or rods which are each supported at one end in support 4 and at their other ends in a bracket 9 in positions paralleling the axes of the cone pulleys 1 and 2. The lower rod 62, in Fig. 3 and also Fig. 1, is secured in fixed relation with respect to the housing and forms a guide over which slots 63 in the bottom edges of the respective end plates 35 and 36 are fitted so that the carriage may slide therealong. The upper rod 64 is threaded along its length and is rotatably mounted in suitable bearings in the housing 4 and bracket 9. The threaded rod 64 engages nuts 65 and 66 which are secured in respective end plates 35 and 36 adjacent the upper ends of these plates. Backlash is taken out of the threaded mechanical connection by means of a compression spring 67 which is compressed between respective nuts 65 and 66. This compression spring biases the nuts 65 and 66 away from one another an amount sufficient to securely engage the faces of the threads of the nuts with the faces of the threads of the threaded bar or shaft 64. In accomplishing this, nut 66 is provided with a square or rectangular shank 66a which slidably fits through a square hole 66b in plate 36. Since the thread faces thus engaged are oppositely disposed, rotation of the bar in either direction results in positive movement without loss of motion of the belt shifter carriage, in one direction or the reverse. The means for rotating the threaded shaft 64 may be a suitable crank or knob 68 secured to the end of the threaded shaft in a position projecting beyond the boundaries of housing 4 so that it may be easily reached. Alternatively, this shaft may be motor operated from a remote point or may be operated by a motor such as m by the mechanical output of a synchro-tie receiver from a transmitter at a remotely located point.

The details whereby adjustment of the draw of a particular section of the mill may be achieved are now more readily appreciated. The adjustment of drive ratio provided by the belt shifter carriage drive affords the desired control of the motor driving a particular section of the mill to obtain satisfactory mill operation.

At such times, however, as it is found desirable to affect a momentary change in the draw of a section of a mill in order to take up slack accumulations in the web or to introduce a slight amount of slack in the web, the adjustment may be conveniently made, without changing the draw setting for the particular section, through the control afforded by the electromagnets which provide slight adjustment of the belt shifter from its mid position between the two electromagnets.

These electromagnets may be connected in series with respecitve push-buttons across a supply of electrical energy. Thus, selective energization of the magnets by operation of the respective push-buttons will permit a small adjustment of the belt shifter with respect to the belt shifter carriage to thereby provide a momentary adjustment of section draw.

Although but one embodiment of this invention has been illustrated in the accompanying drawing and but one application of this invention has been indicated, it will be appreciated that numerous other applications are feasible and that numerous variations in the details of components and in the organization of the respective components may be made by those skilled in the art without departing from the spirit and scope of this invention. Accordingly it is intended that the foregoing disclosure and the illustrations in the drawings are to be considered only as illustrative of the principles of this invention and not interpreted in a limiting sense.

We claim as our invention:

1. A mechanical variable speed drive comprising, a pair of cone pulleys, a belt interconnecting said pulleys, a belt shifter carriage, means mounting said carriage between said cone pulleys for movement parallel to the axes of said pulleys, a belt shifter engaging said belt, spring means resiliently mounting said belt shifter on said carriage for movement relative to said carriage substantially paralleling the path of movement of the carriage and biasing said belt shifter to a given position on said carriage, and means for effecting movement of said belt shifter with respect to said carriage.

2. A mechanical variable speed drive comprising, a pair of cone pulleys, a belt interconnecting said pulleys, a belt shifter carriage, means mounting said carriage between said cone pulleys for movement parallel to the axes of said pulleys, a belt shifter engaging said belt, spring means resiliently mounting said belt shifter on said carriage for movement substantially paralleling the path of movement of the carriage and biasing said belt shifter to a given position, and an electromagnetic actuator mounted on said carriage for moving said belt shifter with respect to said carriage.

3. A mechanical variable speed drive comprising, a support, a pair of cone pulleys journalled in parallel relation on said support, a belt connecting said cone pulleys, a belt shifter carriage comprising a pair of end plates, a carriage track mounted on said support between said cone pulleys and mounting said carriage for movement therealong between said cone pulleys, a belt shifter engaging said belt and comprising a magnetizable plate movably disposed between said end plates, spring means engaging said magnetizable plate and biasing said magnetizable plate to a given position between said end plates, and electromagnetic means mounted on opposite sides of said magnetizable plate on said carriage in flux linkage with said magnetizable plate.

4. A mechanical variable speed drive comprising, a support, a pair of cone pulleys journalled in parallel relation on said support, a belt connecting said cone pulleys, a belt shifter carriage comprising a pair of spaced end sections, a track disposed between said cone pulleys, said carriage being slidably mounted on said track, a threaded rod rotatably mounted on said support and threadedly engaging said carriage, rotation of said rod moving said carriage along said track, a belt shifter engaging said belt and comprising an armature plate movably disposed between said end sections, spring means biasing said armature to a given position between said end sections, and an electromagnet mounted on each end section, each electromagnet having poles confronting said armature plate.

5. A mechanical variable speed drive comprising, a support, a pair of cone pulleys journalled on said support in parallel relation, a belt connecting said cone pulleys, a belt shifter carriage, a track disposed between said cone pulleys and slidably mounting said carriage for movement therealong between said cone pulleys, means for moving said carriage along said track, a belt shifter engaging said belt, spring means movably mounting said belt shifter on said carriage and biasing said belt shifter to a given position with respect to said carriage, an armature plate forming a part of said belt shifter, and a pair of electromagnets respectively mounted on said carriage on opposite sides of said armature plate and in flux linkage therewith.

6. A mechanical variable speed drive comprising, a support, a pair of cone pulleys journalled on said support in parallel relation, a belt connecting said cone pulleys, a belt shifter carriage, a track disposed between said cone pulleys and slidably mounting said carriage for movement therealong between said cone pulleys, a threaded rod rotatably mounted on said support in parallel relation with said track, said threaded rod threadedly engaging said carriage to effect carriage movement along said track by rotation of said rod, a belt shifter engaging said belt, spring means movably mounting said belt shifter on said carriage and biasing said belt shifter to a given position with respect to said carriage, an armature plate forming a part of said belt shifter, and a pair of electromagnets respectively mounted on opposite sides of said armature plate on said carriage and in flux linkage with said armature plate.

7. A mechanical variable speed drive comprising, a pair of belt connected cone pulleys, a belt shifter carriage adjustably mounted between said cone pulleys, a belt shifter engaging the belt, means movably mounting the belt shifter on the carriage, and electromagnetic means mounted on the carriage and operatively associated with the belt shifter for moving the belt shifter relative to the carriage.

8. A mechanical variable speed drive comprising, a pair of belt connected cone pulleys, a belt shifter carriage adjustably mounted between the cone pulleys, a belt shifter engaging the belt and movably mounted on the carriage, an armature plate on the belt shifter, and a pair of electromagnets respectively mounted on the carriage on opposite sides of the armature plate and in flux linkage with the armature plate.

9. A mechanical variable speed drive comprising, a pair of belt connected cone pulleys, a belt shifter carriage adjustably mounted between said cone pulleys, a belt shifter engaging the belt, means movably mounting the belt shifter on the carriage, resilient means engaging said carriage and said belt shifter and biasing said belt shifter to a given position on said carriage, and electromagnetic means supported by the carriage and operatively associated with the belt shifter for moving the belt shifter relative to the carriage.

10. A mechanical variable speed drive comprising, a pair of belt connected cone pulleys, a belt shifter carriage adjustably mounted between said cone pulleys, a belt shifter engaging said belt, a linear guide on said carriage, means slidably mounting said belt shifter on said linear guide, for sliding movement therealong, spring means engaging said belt shifter and biasing said belt shifter to a given axial position along said linear guide, and means operatively associated with said belt shifter for moving said belt shifter from said position along said guide.

11. A mechanical variable speed drive comprising, a pair of belt connected cone pulleys, a belt shifter carriage adjustably mounted between said cone pulleys, a magnetizable belt shifter assembly movably mounted on said carriage and having portions engaging said belt, and at least one electromagnet disposed on said carriage in flux linkage with said magnetizable belt shifter.

12. A mechanical variable speed drive comprising, a pair of belt connected cone pulleys, a belt shifter carriage comprising a pair of spaced plates having a tubular spacer therebetween, a magnetizable belt shifter slidably mounted over said tubular spacer and having portions engaging said belt, means movably mounting said carriage between said cone pulleys, means engaged with said belt shifter and said tubular spacer for preventing relative angular displacement therebetween, and electromagnetic means in flux linkage with said magnetizable belt shifter for actuating said belt shifter.

13. A mechanical variable speed drive comprising, a pair of belt connected cone pulleys, a belt shifter carriage comprising a pair of spaced plates having a tubular member therebetween, a belt shifter slidably mounted on said tubular member, means engaging said tubular member and said belt shifter for preventing relative angular movement therebetween, means movably mounting said belt shifter carriage between said cone pulleys, and means operatively associated with said belt shifter for moving said belt shifter along said tubular member.

14. A mechanical variable speed drive comprising, a pair of belt connected cone pulleys, a belt shifter carriage movably mounted between said cone pulleys and having a tubular member thereon, said tubular member having diametrically disposed slots therein extending axially of said tubular member, a belt shifter slidably mounted over said tubular member, a pin mounted on said belt shifter and passing into said slots, and means operatively associated with said belt shifter for moving said belt shifter over said tubular member.

15. A mechanical variable speed drive comprising, a pair of belt connected cone pulleys, a belt shifter carriage movably mounted between said cone pulleys and having a tubular member thereon, said tubular member having diametrically disposed slots therein extending axially of said tubular member, a belt shifter slidably mounted over said tubular member, a pin mounted on said belt shifter and passing into said slots, resilient means engaging said belt shifter and biasing said belt shifter to a given position along said tubular member, and means operatively associated with said belt shifter for moving said belt shifter over said tubular member.

16. A mechanical variable speed drive comprising, a pair of belt connected cone pulleys, a belt shifter carriage movably mounted between said cone pulleys and having a tubular member thereon, said tubular member having diametrically disposed slots therein extending axially of said tubular member, a belt shifter slidably mounted over said tubular member, a pin mounted on said belt shifter and passing into said slots, means forming axially spaced shoulders inside said tubular member in substantially axially symmetrical relation with respect to said slot, the axial dimension between said shoulders corresponding to the cross-sectional dimension of said pin, spring means in said tubular member bearing against said shoulders, and means operatively associated with said belt shifter for moving said belt shifter over said tubular member.

References Cited in the file of this patent

UNITED STATES PATENTS

| | | |
|---|---|---|
| 316,136 | Foss | Apr. 21, 1885 |
| 1,702,627 | Bronander | Feb. 19, 1929 |
| 1,727,232 | Farrell | Sept. 3, 1929 |
| 2,092,558 | Richards | Sept. 7, 1937 |
| 2,525,257 | Doiron | Oct. 10, 1950 |
| 2,550,952 | Allen | May 1, 1951 |
| 2,638,008 | Guibert | May 12, 1953 |